(12) United States Patent
Hruby et al.

(10) Patent No.: US 7,995,357 B2
(45) Date of Patent: *Aug. 9, 2011

(54) CABLE MANAGEMENT ARRANGEMENT FOR A TELECOMMUNICATIONS CABINET

(75) Inventors: Kevin L. Hruby, Minnetonka, MN (US); Glen Cordle, Centerville, MN (US); Cindy S. Walters, Prior Lake, MN (US); Michael Kenneth Barth, Bloomington, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/806,240

(22) Filed: Aug. 5, 2010

(65) Prior Publication Data
US 2011/0044020 A1    Feb. 24, 2011

Related U.S. Application Data

(63) Continuation of application No. 11/906,317, filed on Oct. 1, 2007, now Pat. No. 7,787,260.

(60) Provisional application No. 60/959,030, filed on Jul. 9, 2007.

(51) Int. Cl.
*H02B 1/20* (2006.01)

(52) U.S. Cl. .................................. 361/826; 361/825

(58) Field of Classification Search .......... 361/825–826, 361/730, 752, 790, 796, 797, 800
See application file for complete search history.

(56) References Cited

U.S. PATENT DOCUMENTS

| | | |
|---|---|---|
| 5,717,810 A | 2/1998 | Wheeler |
| 5,788,087 A | 8/1998 | Orlando |
| 5,901,033 A | 5/1999 | Crawford et al. |
| 6,102,214 A | 8/2000 | Mendoza |
| 6,289,159 B1 | 9/2001 | Van Hees et al. |
| 6,487,356 B1 | 11/2002 | Harrison et al. |
| 6,537,106 B1 | 3/2003 | Follingstad |
| 6,543,626 B1 | 4/2003 | Mendoza |
| 6,665,484 B2 | 12/2003 | Douglas et al. |
| 6,918,793 B2 | 7/2005 | Baker et al. |
| 7,095,844 B2 | 8/2006 | Baker et al. |
| 7,116,777 B2 | 10/2006 | Knudsen et al. |
| 7,260,302 B2 | 8/2007 | Caveney |
| 7,493,002 B2 | 2/2009 | Coburn et al. |
| 7,787,260 B2 * | 8/2010 | Hruby et al. .................. 361/827 |
| 2002/0170726 A1 | 11/2002 | Mendoza |
| 2006/0171651 A1 | 8/2006 | Laursen |
| 2006/0182407 A1 | 8/2006 | Caveney |
| 2006/0228087 A1 | 10/2006 | Bayazit et al. |

OTHER PUBLICATIONS

U.S. Appl. No. 11/655,764; Fiber Optic Adapter Cassette and Panel; Coburn et al.; filed Jan. 19, 2007.

* cited by examiner

*Primary Examiner* — Hung S Bui
(74) *Attorney, Agent, or Firm* — Merchant & Gould P.C.

(57) ABSTRACT

A telecommunications system including a frame to which telecommunications equipment is mounted. The frame defines a patch panel region and an active equipment region. Patch cords are interconnected between the patch panel region and the active equipment region. The system further includes a slack storage panel that stores patch cord slack. The slack storage panel defines a single cable routing pathway. The patch cords are routed through the slack storage panel such that no portion of the length of each patch cord overlaps itself. In systems including both copper and fiber cables, the copper cables are routed separately from the fiber cables.

11 Claims, 14 Drawing Sheets

CABLE MANAGEMENT ARRANGEMENT FOR A TELECOMMUNICATIONS CABINET

CROSS-REFERENCE TO RELATED APPLICATIONS

This application is a continuation of U.S. application Ser. No. 11/906,317, filed Oct. 1, 2007 now U.S. Pat. No. 7,787,260; which claims the benefit of U.S. Provisional Application Ser. No. 60/959,030, filed Jul. 9, 2007; which applications are incorporated herein by reference.

FIELD OF THE INVENTION

The present disclosure relates generally to devices for use in the telecommunications industry, and various methods associated with such devices. More particularly, this disclosure relates to a cable routing arrangement and various cable routing constructions for a telecommunications cabinet.

BACKGROUND OF THE INVENTION

In telecommunication facilities, telecommunications equipment is mounted to one of a number of framework structures (e.g., cabinets or racks). A vast number of cables are run from, to, and between the equipment mounted to the framework structures. Slack length of each cable is typically routed from the equipment to a side region of the framework structure and wrapped about cable spools for storage. With the vast number of cables, the mass of slack length can become difficult to manage; especially in circumstances where repair or maintenance of one cable, buried well beneath the wound loops of other cable slack lengths, is required.

In general, conventional arrangements for managing cables can be improved.

SUMMARY OF THE INVENTION

The present disclosure relates to a cable management arrangement for a telecommunications cabinet. The cable management arrangement allows for the routing, protection, separation and slack storage of cabling that runs within the telecommunications cabinet. In one aspect, the cable management arrangement provides a cable routing arrangement wherein no portion of the cabling overlaps or is wound upon itself. This enhances cable accessibility by eliminating situations where a user must unwind other cabling to access a single cable buried within wound cable slack. In another aspect, the cable management arrangement provides separate channels to route and protect different types of cabling. The present arrangement can be used with active equipment configured with high density fiber ports or high density copper ports.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
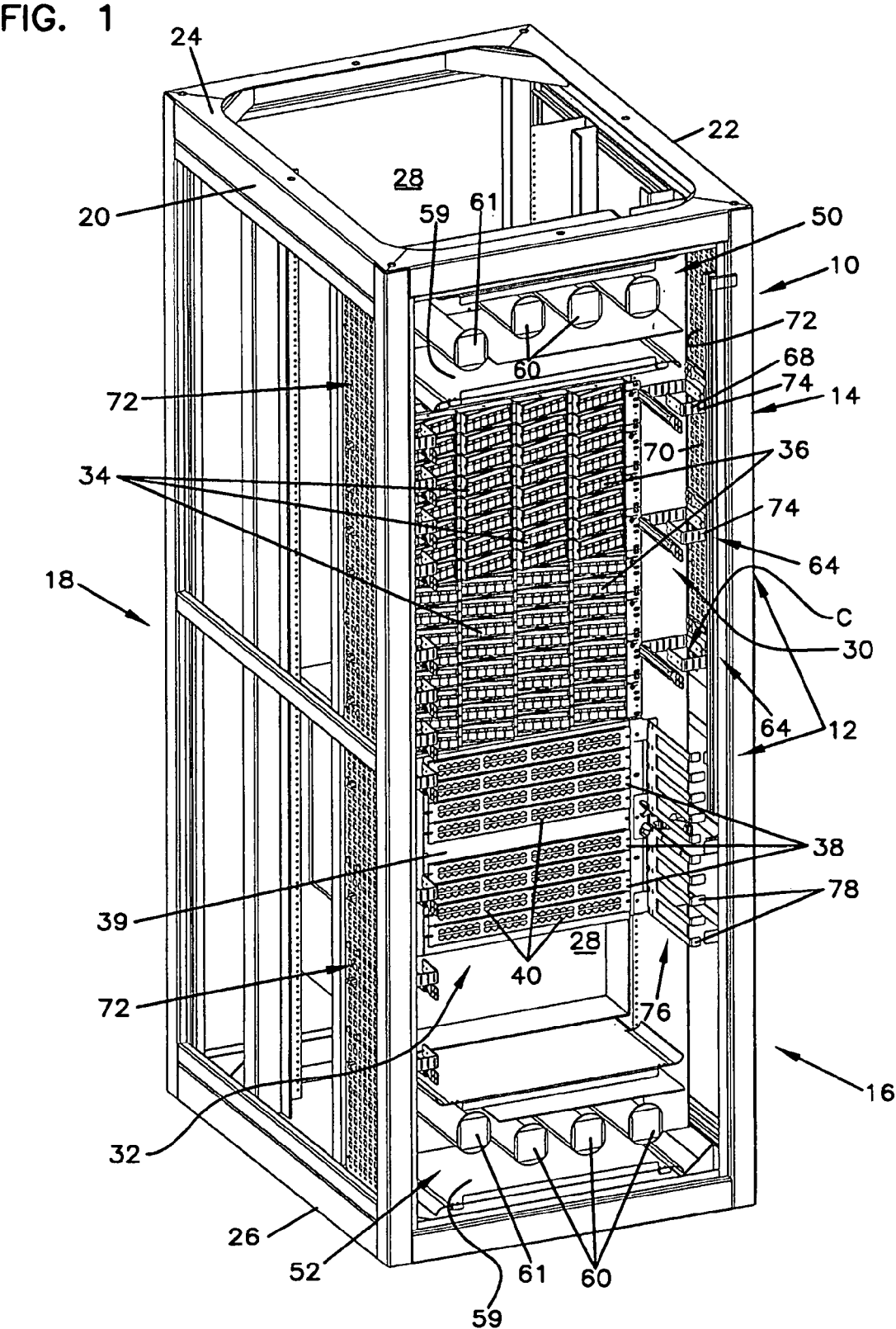
FIG. 1 is a front perspective view of one embodiment of a telecommunications cabinet including a cable management arrangement in accordance with the principles disclosed.

FIG. 1 illustrates one embodiment of a telecommunications system 10 including a cable management arrangement 12 in accordance with the principles disclosed. In the illustrated embodiment, the cable management arrangement 12 is incorporated into a telecommunications cabinet 14. It is to be understood, however, that the present cable management arrangement 12 can be utilized in systems having other equipment structures, such as racks, wall boxes, and other enclosures or framework.

Figure 2:
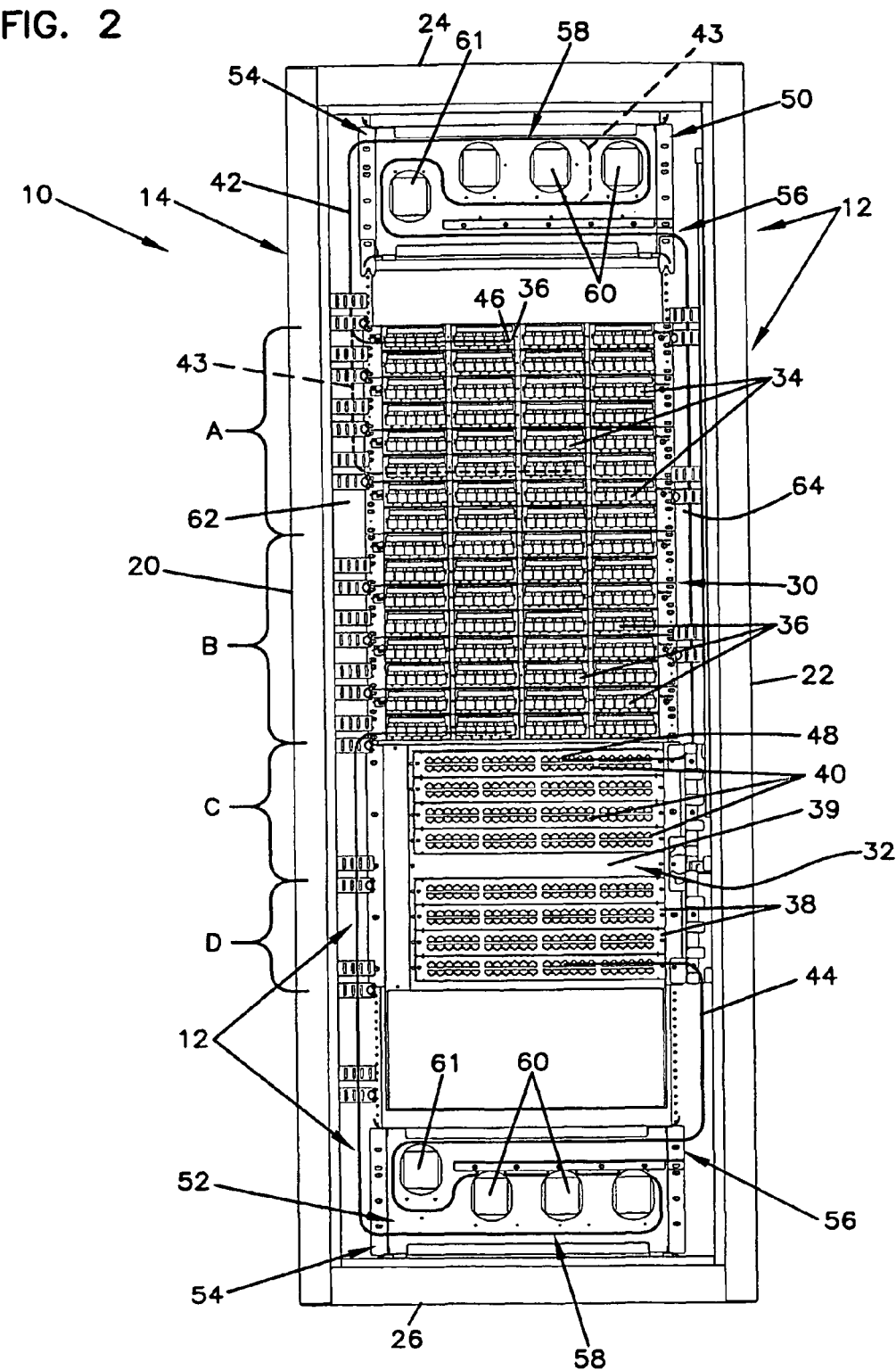
FIG. 2 is a front elevation view of the telecommunications cabinet of FIG. 1, illustrating cable routings.

Referring to FIGS. 1 and 2, the telecommunications cabinet 14 of the present system 10 generally includes a front 16, a rear 18, a first side 20 (e.g., the left side), an opposite second side 22, (e.g., the right side), a top 24, and a bottom 26. The first and second sides 20, 22 extend between the front 16 and rear 18 and the top 24 and bottom 26. Panels or doors (not shown) can be mounted to each of the front, rear, sides, top, and bottom of the telecommunications cabinet 12 to enclose an interior 28 of the cabinet 12.

The illustrated telecommunications system 10 includes a patch panel region 30 and an active equipment region 32. The patch panel region 30 is located in an upper portion of the interior 28 of the cabinet. The active equipment region 32 is located beneath the patch panel region 30 in a lower portion of the interior 28 of the cabinet 14.

The patch panel region 30 defines a number of patch panel zones, including patch panel zone A and patch panel zone B.

In the illustrated embodiment, each of the patch panel zones A, B includes one or more patch panels 34. Further details of one type of patch panel that can be used are provided in U.S. Pat. No. 6,537,106; which patent is incorporated herein by reference. The one or more patch panels 34 define patch panel connections 36. Each of the patch panel connections 36 of the patch panel region 30 is accessible from the front 16 of the cabinet 14. Cables (not shown) are interconnected to the rear of the patch panels. The rear cables are routed out the top 24 of the cabinet for connection to other equipment.

The active equipment region 32 also defines a number of equipment connection zones, including equipment connection zone C and equipment connection zone D. In the illustrated embodiment, each of the zones C, D includes one or more line cards 38 that provide switching capabilities. The one or more line cards 38 define equipment connections 40. The active equipment line cards 38 can be configured with high density fiber ports or high density copper ports. In the illustrated embodiment of FIGS. 1-8, the line cards 38 are configured with high density copper ports. A supervisor card 39, having fiber cable connections, controls the switching functions of the high density copper line cards 38. Each of the equipment connections 40 of the active equipment region 32 is accessible from the front 16 of the cabinet 14.

Referring to FIG. 2, patch cables or patch cords (e.g., 42, 44) are used to provide electrical interconnections between the patch panels 34 and the line cards 38. Each patch cord (e.g. 42) includes a first connection end 46 configured to connect to a selected one of the patch panel connections 36, and a second connection end 48 configured to connect to a selected one of the equipment connections 40.

Each patch cord (e.g., 42, 44) has a patch cord or cable length defined between the first and second connection ends 46, 48. In one application, all the patch cords have the same cable length. The cable management arrangement 12 of the present disclosure is designed to accommodate the use and routing of common-length patch cords between the active equipment region 32 and the patch panel region 30. This eliminates the need to customize the length of patch cords and the cost associated with such customization. As will be understood, the common-length patch cord routing is all performed and accessible from the front 16 of the telecommunications cabinet 14.

Still referring to FIG. 2, depending upon the locations of the patch cord connections, the excess length or slack length of each patch cord can vary. The present telecommunication system includes slack storage panels (e.g., 50, 52) that are arranged and configured to store the excess length of all patch cords interconnected to the system 10. In the illustrated embodiment, a first upper slack storage panel 50 is located above the patch panel region 30 adjacent to the top 24 of the cabinet 14. A second lower slack storage panel 52 is located below the active equipment region 32 adjacent to the bottom 26 of the cabinet.

Each of the slack storage panels 50, 52 includes an entrance 54, an exit 56, and a single cable routing pathway 58 defined between the entrance 54 and exit 56. It is to be understood that while reference is made to an entrance and an exit, the terms are interchangeable, as patch cords entering can also be interpreted as exiting depending upon the direction of travel along the length of the patch cord.

The entrance and exit 54, 56 of each slack storage panel 50, 52 are located at opposite sides of the slack storage panel. In relation to cabinet 14, the entrances 54 of both the upper and lower slack storage panels 50, 52 are located adjacent to the left side 20 of the cabinet 14, while the exits 56 of the panels 50, 52 are located adjacent to the right side 22 of the cabinet.

For each of the upper and lower slack storage panels 50, 52, the patch cords (e.g., 42, 44) enter and exit the panel in generally horizontal directions.

Referring back to FIGS. 1 and 2, spools 60, 61 are secured to each of the slack storage panels 50, 52. A majority of the spools 60 are aligned in a generally horizontal arrangement. The generally horizontal arrangement of the spools 60 defines portions of the single cable routing pathway 58. As illustrated by the routing of patch cord 44, what is meant by a "single" cable routing pathway is that no portion of the cable routing pathway 58 overlaps another portion of the cable routing pathway; accordingly, no portion of the patch cord (e.g., 42, 44) overlaps upon itself. That is, the slack storage panels 50, 52 are constructed and arranged so that none of the patch cords wind repeatedly about a portion of the pathway. By this, a user can quickly and easily remove or access a particular patch cord among a number of patch cords without having to unwrap or unwind loops of length of other patch cords.

Figure 3:
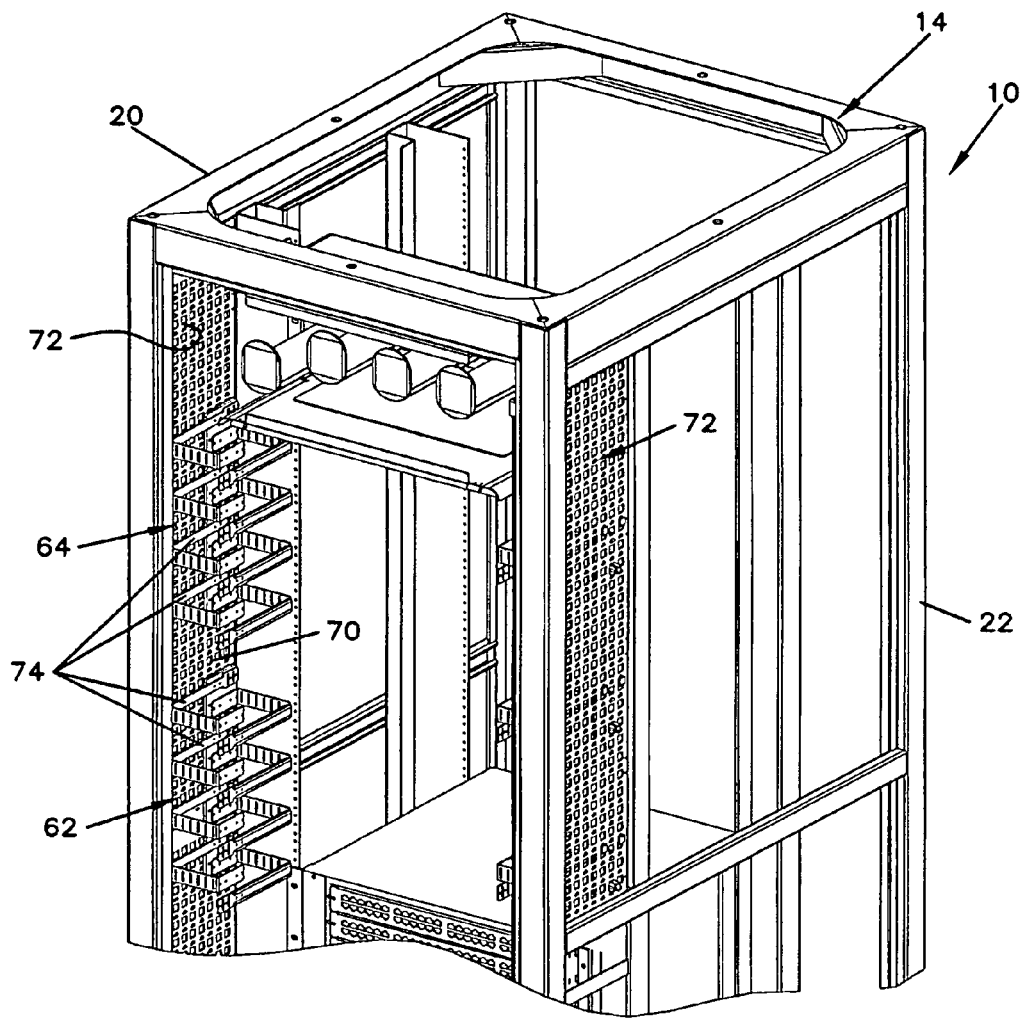
FIG. 3 is a front right-side perspective view of the upper region of the telecommunications cabinet of FIG. 1, with equipment not shown to illustrate vertical cable channels located at the sides of the cabinet.
Figure 4:
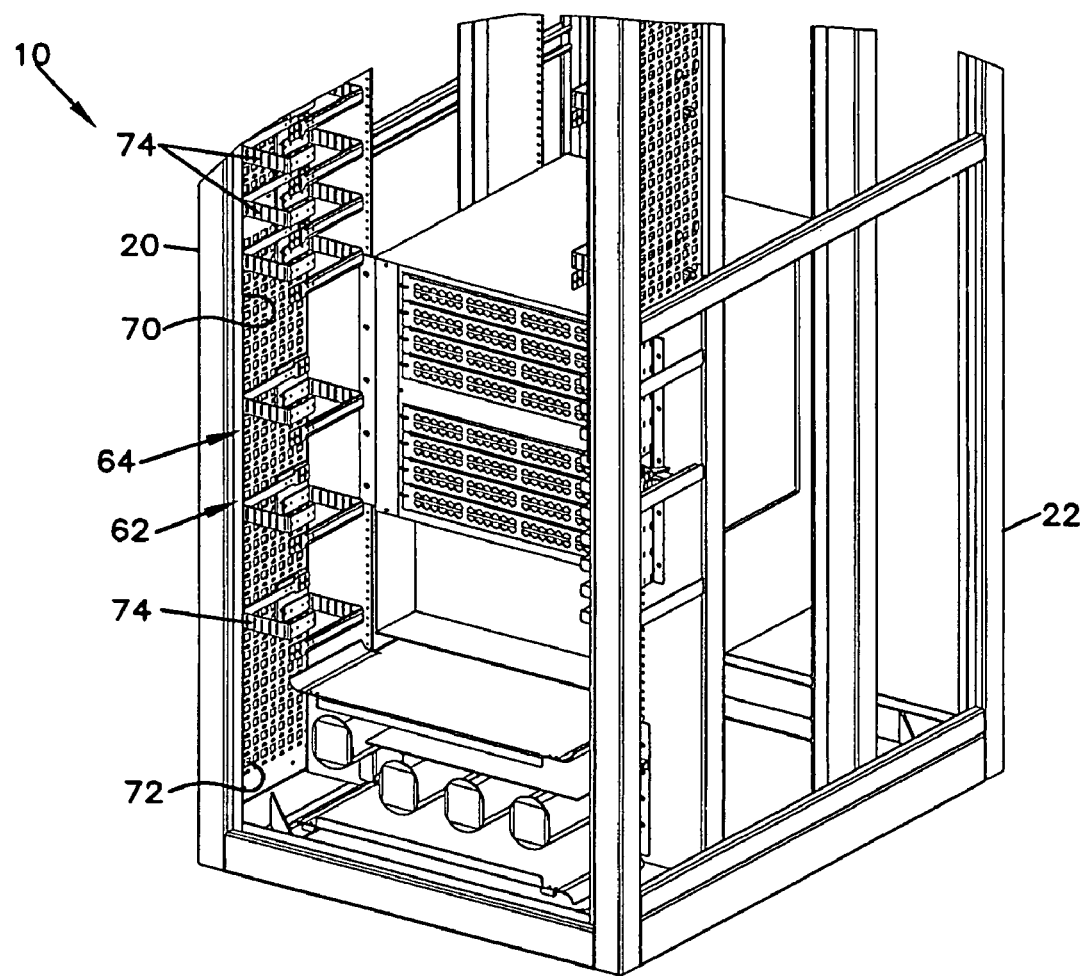
FIG. 4 is a front right-side perspective view of the lower region of the telecommunications cabinet of FIG. 3.
Figure 5:
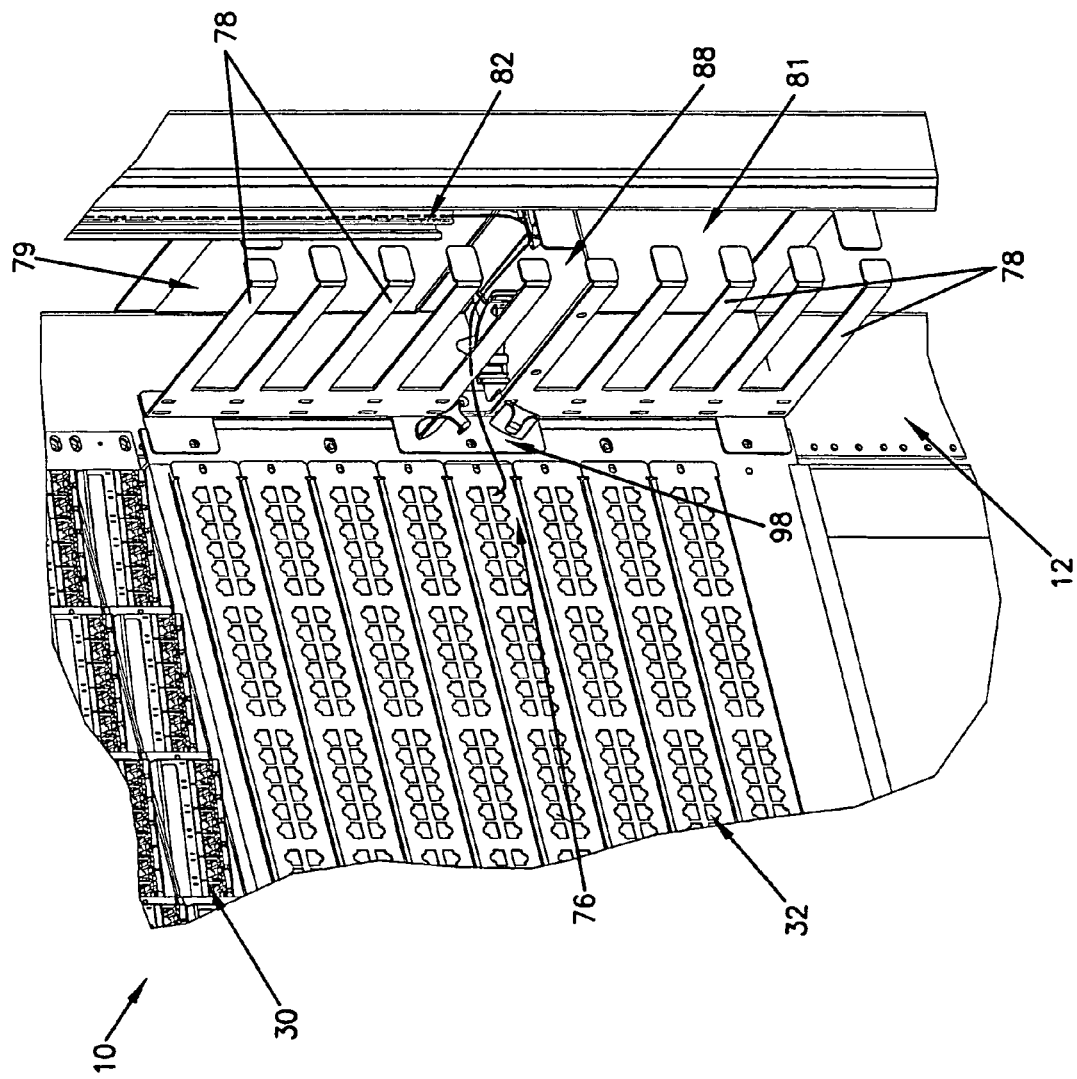
FIG. 5 is a front left-side perspective view of the telecommunications cabinet of FIG. 1, illustrating a cable separation arrangement.
Figure 6:
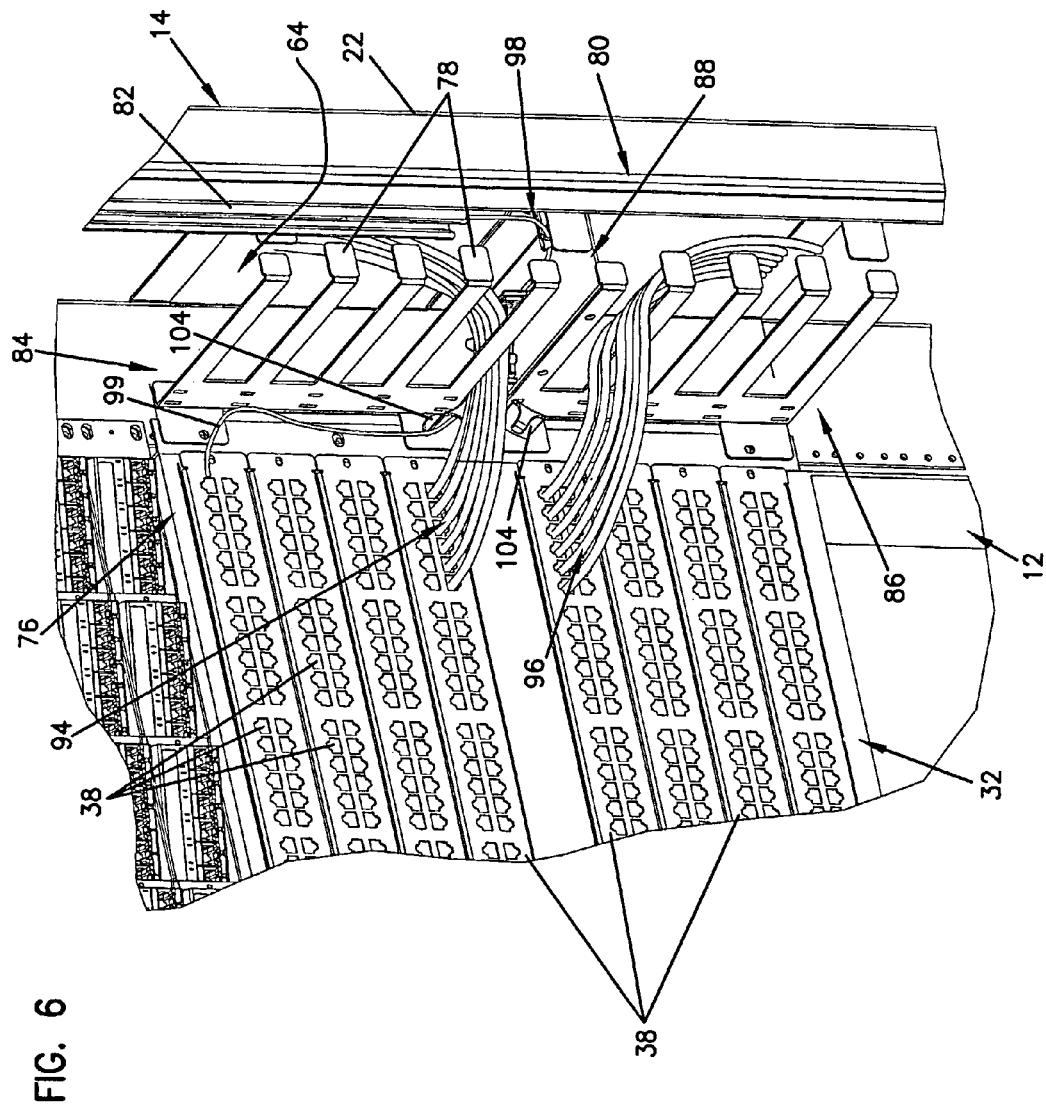
FIG. 6 is another front left-side perspective view of the cable separation arrangement of FIG. 5.
Figure 7:
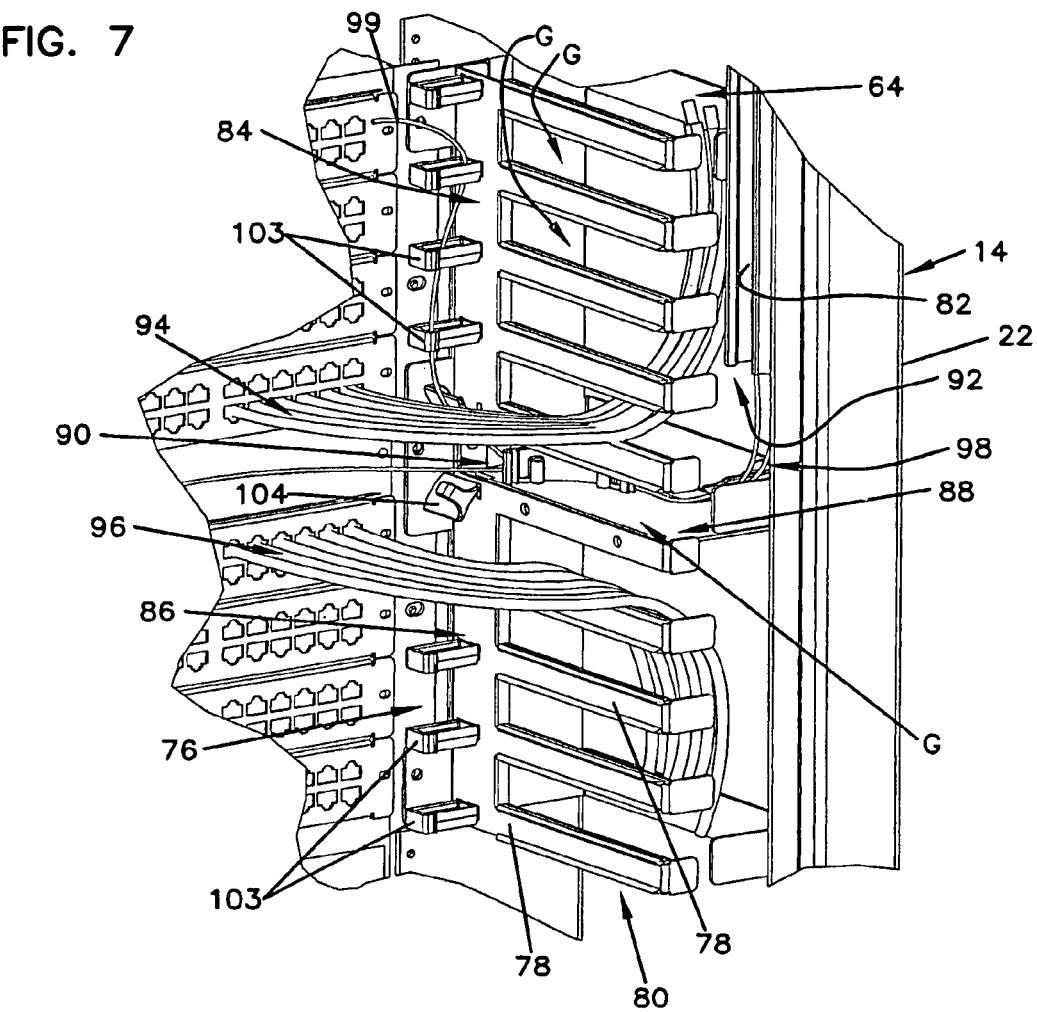
FIG. 7 is yet another front left-side perspective view of the cable separation arrangement of FIG. 6.

Referring now to FIGS. 1, 3, and 4, the telecommunication system 10 further includes a first vertical cable channel 62 (FIGS. 3 and 4) located at the left side 20 of the cabinet 14, and a second vertical cable channel 64 (FIG. 1) located at the right side 22 of the cabinet 14. Each of the first and second vertical cable channels 62, 64 are located adjacent to the front 16 of the cabinet 14 so that a user can access patch cords routed with the channels 62, 64.

In the illustrated embodiment, at least a portion of each vertical cable channel 62, 64 is defined by cable management devices 68 (such as rings 74). The devices are secured to a mounting face 70 of an interface panel 72 located at each of the left and right sides 20, 22 of the cabinet 14. Further details of one example of an interface panel that can be used are described in U.S. Patent Publication No. 2006/0228087; which publication is incorporated herein by reference. The mounting devices 68, such as cable rings, are selectively attachable and detachable to the interface panel 72 so that the system can be customized to the user's particular needs.

The interface panels 72 are each oriented such that the mounting face 70 faces toward an opposite side of the cabinet 14. For example, the mounting face 70 of the right interface panel faces toward the left side 20 of the cabinet; likewise, the mounting face 70 of the left interface panel faces toward the right side 22 of the cabinet. The cable management devices 68 are secured to each of the sideward mounting faces 70 and accordingly extend from the mounting faces 70 toward one of the left and right sides 20, 22 of the cabinet 14. The vertical cable channels 62, 64 defined by the devices 68 are used in part to vertically route the patch cords between the patch panel region 30 and the slack storage panels 50, 52.

Referring now to FIGS. 5-8, the present cable management arrangement 12 of the telecommunications systems 10 further includes a cable separation arrangement 76. The cable separation arrangement 76 separates groupings of cables interconnecting to or routing from the active equipment region 32.

The cable separation arrangement 76 generally includes a plurality of spaced apart ribs or fingers 78 that extend toward the front 16 of the cabinet 14 (see FIG. 1). A portion 80 of the second vertical cable channel 64 is defined between the fingers 78 and the right side 22 of the cabinet 14. The spaced apart fingers 78 define gaps G (FIG. 7) therebetween. The gaps G provide access to the vertical cable channel 64 (i.e., to the portion 80 of the second vertical cable channel 64).

In use, different groupings of cables are fed through particular gaps G defined by the fingers 78 of the cable separation arrangement 76. For example, in one arrangement, each grouping of patch cords (e.g., 94, 96 shown in FIGS. 6 and 7)

associated with a particular line card 38 in the active equipment region 32 is routed through one particular gap. This provides a neat and orderly cabling routing system having an organizational scheme that eases maintenance and/or repair.

The cable separation arrangement 76 further includes a dedicated vertical cable channel 82 located adjacent to the second vertical cable channel 64 (i.e., located at the same right side 22 of the cabinet 14). The dedicated vertical cable channel 82 is separate from the second vertical cable channel 64, and is "dedicated" for use in routing particular cables, as will be described in greater detail hereinafter. In the illustrated embodiment, the dedicated cable channel 82 is located forward of the second vertical cable channel 64. In the illustrated embodiment, the dedicated vertical cable channel 82 is a 1 inch by 2 inch channeling construction that routes the particular cables to an exit (not shown) at the top 24 of the cabinet.

The cable separation arrangement 76 also includes a horizontal tray 88 that divides the fingers 78 into an upper set of fingers 84 and a lower set of fingers 86. One of the gaps G defined by the fingers 78 defines an access opening 90 (FIG. 7) (e.g., an entrance or exit) to the tray 88. An access opening 92 of the dedicated vertical cable channel 82 of the cable separation arrangement 76 is located adjacent to and is accessible from the tray 88.

In use, the tray 88 and dedicated vertical cable channel 82 of the cable separation arrangement 76 separate different types of cabling. For example, the groupings of patch cords 94, 96 are each routed through one of gaps G defined by the fingers 78 and into the second vertical cable channel 64. Another type of cable grouping 98 (e.g., fiber optic cables), however, is routed through the gap that defines the access opening 90 to the tray 88. From the tray 88, the fiber cable grouping 98 is routed into the separate, dedicated vertical cable channel 82.

As previously described, the active equipment line cards 38 can include copper line cards and fiber line cards. In the present embodiment, the active equipment region 32 includes the one fiber supervisor line card 39; the remaining line cards 38 are copper line cards. The fiber cable 98 (FIG. 5) from the fiber supervisor line card 39 is separated and routed within the dedicated vertical cable channel 82. For applications including additional fiber line cards, fiber cables (e.g., 99, illustrated in FIGS. 6 and 7 for demonstrative purposes only) from all the fiber line cards are grouped and routed within the dedicated vertical cable channel 82.

Separating the patch cords 94, 96 from the fiber optic cables 98 reduces damage that often occurs when heavy copper patch cord cabling is routed along with more delicate fiber optic cabling. In addition, the bend radius for each of the patch cords and the fiber optic cables is different. The present cable separation arrangement 76 separates the routing for each type of cabling so that the particular bend radius requirements of the different cabling can be accommodated.

Figure 8:
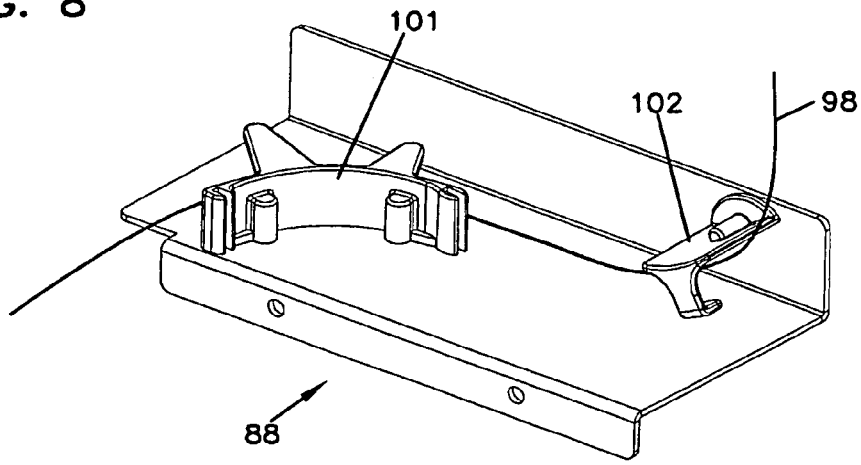
FIG. 8 is a perspective view of a tray of the cable separation arrangement of FIG. 7, shown in isolation.

Referring now to FIG. 8, in the illustrated embodiment, to maintain the bend radius of the fiber optic cables, the tray 88 includes a number of radius-limiting elements. In particular, the tray 88 includes a first radius-limiting element 101 located to provide a 90 degree horizontal transition from the access opening 90 of the tray 88 toward the vertical cable channel 82. A second radius-limiting element 102 is located to provide a 90 degree vertical transition from the tray 88 into the access opening 92 of the dedicated vertical cable channel 82. In the illustrated embodiment, each of the radius-limiting elements 101, 102 limits the bend radius of fiber optic cables to a 1.5 inch bend radius.

Referring back to FIG. 7, the cable separation arrangement 76 further includes an arrangement of cable rings 103 used only for the routing of fiber optic cables (e.g. 99) connected to the line cards 38. Further details of one type of cable ring that can be used are provided in U.S. Pat. No. 6,665,484; which patent is incorporated herein by reference. The cable rings 103 are vertically arranged along side the line cards 38 and feed into the access opening 90 of the tray 88. Radius-limiting elements 104 (see also FIG. 6) are located adjacent to the access opening 90 of the tray 88 to aid in transitioning the fiber cables from a vertical routing defined by the rings 103 to the horizontal routing defined by the tray 88. Similar to the previously described radius-limiting elements 101, 102, the radius-limiting elements 104 limit the bend radius of the fiber optic cables to a 1.5 inch bend radius.

The tray 88 of the cable separation arrangement 76 functions in several ways to aid in organizing cables exiting or entering the active equipment region 32. First, as previously described, the tray 88 separates copper patch cords (e.g., 94, 96) from the fiber cables (e.g., 98) and further provides a pathway for fiber cables defined by particular radius-limiting elements (e.g., 101, 102). Second, the tray 88 separates the second vertical cable channel into an upper portion 79 (FIG. 5) and a lower portion 81. The gaps G defined by the upper set of fingers 84 provide access to the upper portion 79 of the second vertical cable channel 64. The gaps G defined by the lower set of fingers 86 provide access to the lower portion 81 of the second vertical cable channel 64. Cable groupings (e.g., 94) that are routed through the upper set of fingers 84 are able to route only through the upper portion 79 of the vertical cable channel; likewise, cable groupings (e.g., 96) that are routed through the lower set of fingers 86 are able to route only through the lower portion 81 of the vertical cable channel 64. This again provides a neat and orderly cabling routing system having an organizational scheme that eases maintenance and/or repair.

In use, and referring back to FIG. 2, each of the patch cords (e.g., 42, 44) interconnected to a particular zone is routed through at least one of the first and second vertical cable channels 62, 64 and enters a particular slack storage panel (e.g., 50, 52) from the same vertical cable channel as that of the other patch cords of that particular patch panel zone.

For example, each of the patch cords (e.g., 42) of patch panel zone A is routed upward through the first vertical cable channel 62 into the entrance 54 of the upper slack storage panel 50. As previously described, a middle portion (i.e., the slack length) of the cable is routed within the single cable routing pathway 58 of the slack storage panel 50 such that no portion of the cable overlaps itself. This is accomplished by selectively routing the cable about the spool 60 that best accommodates the excess slack length of the particular patch cord. For instance, for patch cords connected at a patch panel connection 36 located lower in the zone A, the slack length (e.g., 43, only partly shown in dashed line) may be routed about the middle spool, as opposed to the most rightward spool. Referring to FIG. 1, each of the panels 50, 52 further provides a simple pass-through region 59 for patch cords having such a corresponding slack length.

In general, each of the patch cables (e.g., 42, 43) of a particular zone (e.g., zone A) is similarly routed through one of the vertical cable channels and into one of the slack storage panels to manage the cables in a neat and orderly manner. Other patch cords of at least one other zone are routed to the lower slack storage panel. For example, each of the patch cords (e.g., 44) of patch panel zone B is routed downward through the first vertical cable channel 62 to the entrance 54 of the lower slack storage panel 52. In the slack storage panel 52, the patch cord is selectively route about the spool 60 that best accommodates the excess slack length of that particular patch cord.

Because each of the patch cords of a particular patch panel zone A, B, are routed through only one of the upper and lower slack storage panels, patch cord density within the vertical cable channels 62, 64 and slack storage panels 50, 52 is better managed. In the illustrated embodiment of FIG. 1, the cross-sectional area (C, shaded) of the vertical cable channels 62, 64 is defined by an 8 inch offset from the front 16 of the cabinet 14. Cable density, or space utilized by cables within the vertical channel, is preferably no greater than 60 percent. The disclosed cable density is based upon copper patch cords having a diameter of approximately 0.235 inches. This arrangement provides ample room or space for a user to access cables located within the particular vertical cable channel. Cable density is managed in part by the separating the patch cord routing or pathways of each of the zones A, B of the patch panel region into one of an upward routing and a downward routing. The tray 88 of the cable separation arrangement 76 similarly manages cable density.

Referring now to FIGS. 9-15, another embodiment of a telecommunications system 100 including a cable management arrangement 112 is illustrated. Similar to the previous embodiment, the cable management arrangement 112 is incorporated into a telecommunications cabinet 114.

Figure 9:
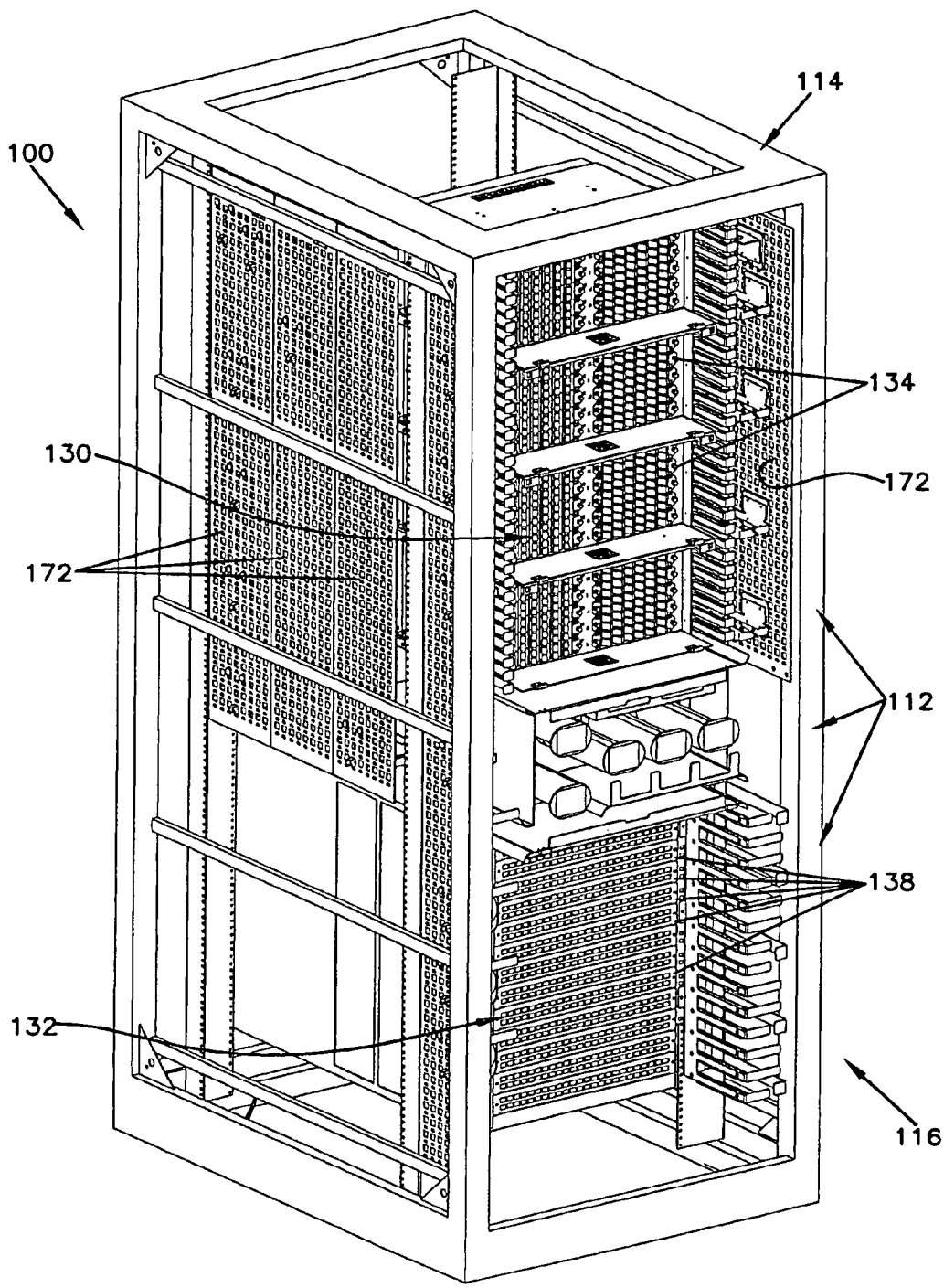
FIG. 9 is a front perspective view of another embodiment of a telecommunications cabinet including another cable management arrangement in accordance with the principles disclosed.
Figure 10:
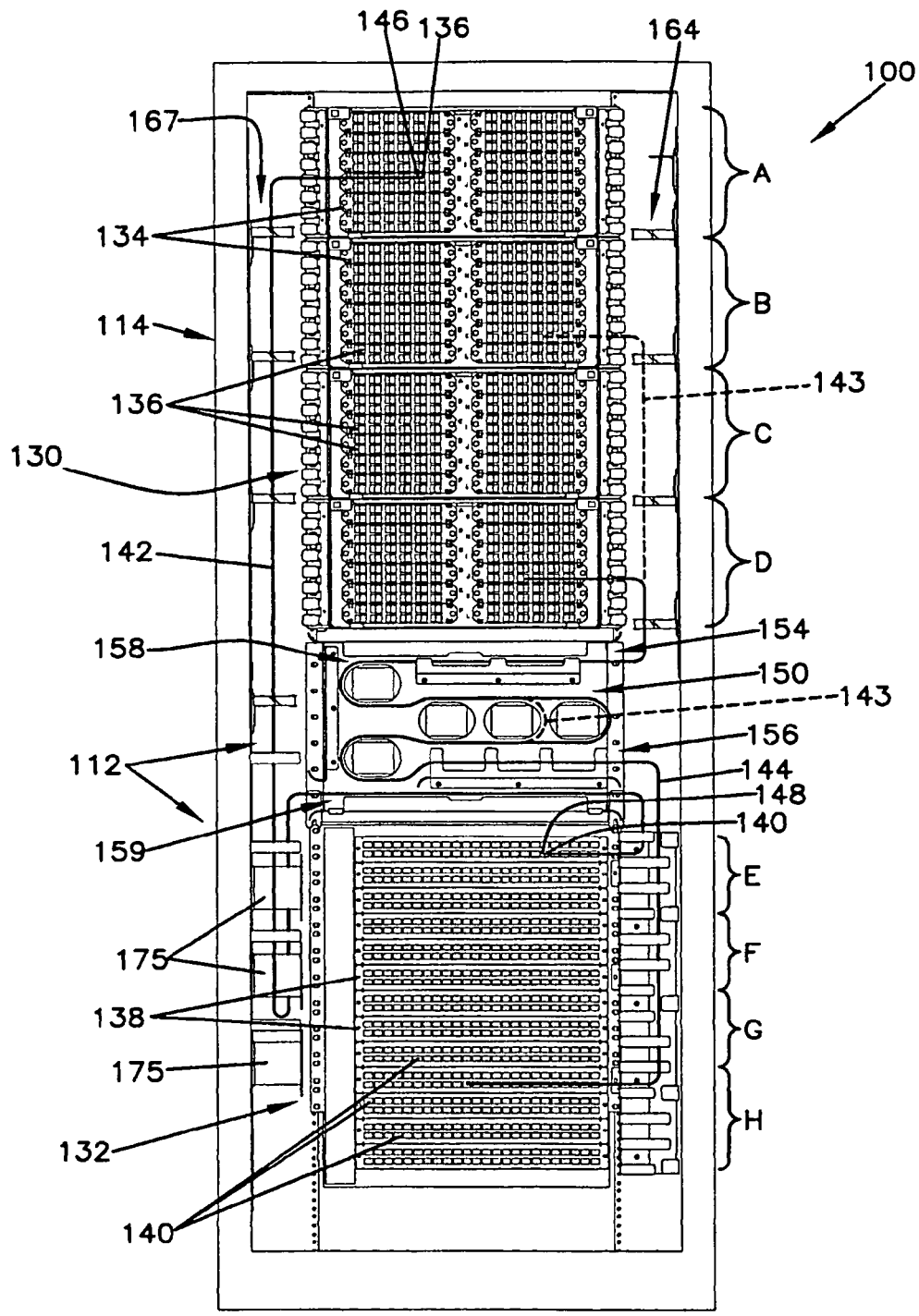
FIG. 10 is a front elevation view of the telecommunications cabinet of FIG. 9, illustrating cable routings.

Referring to FIGS. 9 and 10, the telecommunications cabinet 114 of the telecommunications system 100 generally includes a patch panel region 130 and an active equipment region 132. The patch panel region 130 is located in an upper portion of the interior of the cabinet. The active equipment region 132 is located beneath the patch panel region 130 in a lower portion of the interior of the cabinet 114.

The patch panel region 130 defines a number of patch panel zones, including patch panel zones A-D (FIG. 10). In the illustrated embodiment, each of the patch panel zones includes one or more patching modules 134. Further details of one type of patching module that can be used are provided in U.S. patent application Ser. No. 11/655,764; which application is incorporated herein by reference. The one or more patching modules define patching connections 136. Each of the patching connections 136 of the patch panel region 130 is accessible from a front 116 of the cabinet 114.

The active equipment region 132 similarly defines a number of equipment connection zones, including equipment connection zones E-H. In the illustrated embodiment, each of the zones includes one or more line cards 138 that provide switching capabilities. The one or more line cards 138 define equipment connections 140. The active equipment line cards 138 can either be configured with high density fiber ports or high density copper ports. In the illustrated embodiment of FIGS. 9-15, the lines cards 138 are configured with high density fiber ports. Each of the equipment connections 140 of the active equipment region 132 is accessible from the front 116 of the cabinet 114.

Referring to FIG. 10, patch cables or patch cords (e.g., 142, 144) are used to provide electrical interconnections between the patching modules 134 and the line cards 138. Each patch cord (e.g. 142) includes a first connection end 146 configured to connect to a selected one of the patch panel connections 136, and a second connection end 148 configured to connect to a selected one of the equipment connections 140.

Each patch cord (e.g., 142, 144) has a patch cord or cable length defined between the first and second connection ends 146, 148. In one application, all the patch cords have the same cable length. The cable management arrangement 112 of the present disclosure is designed to accommodate the use and routing of common-length patch cords between the active equipment region 132 and the patch panel region 130. This eliminates the need to customize the length of patch cords and the cost associated with such customization. As will be understood, the common-length patch cord routing is all performed and accessible from the front 116 of the telecommunications cabinet 114.

Still referring to FIG. 10, depending upon the location of the patch cord connections, the excess length or slack length of each patch cord can vary. The present telecommunication system 100 includes a slack storage panel 150 arranged and configured to store the excess length of all patch cords interconnected to the system 100. In the illustrated embodiment, the slack storage panel 150 is located between the patch panel region 130 and the active equipment region 132 of the cabinet 114.

The slack storage panels 150 includes an entrance 154, an exit 156, and a single cable routing pathway 158 defined between the entrance 154 and exit 156. The entrance and exit 154, 156 are located at one side (e.g., the right side) of the slack storage panel 150. The patch cords (e.g., 142, 144) enter and exit the slack storage panel 150 in generally horizontal directions.

Figure 11:
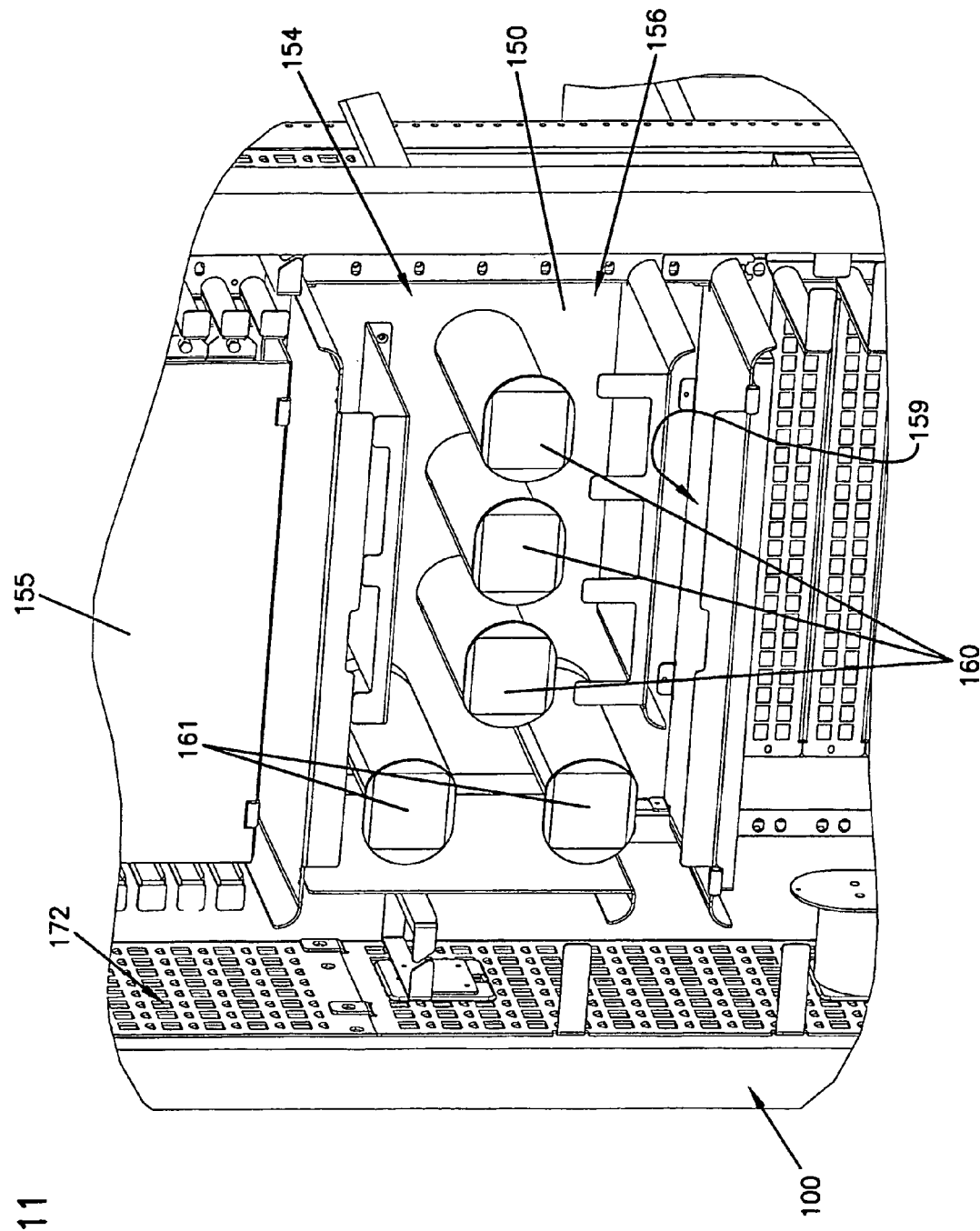
FIG. 11 is a front perspective view of a slack storage panel of the telecommunications cabinet of FIG. 9.
Figure 12:
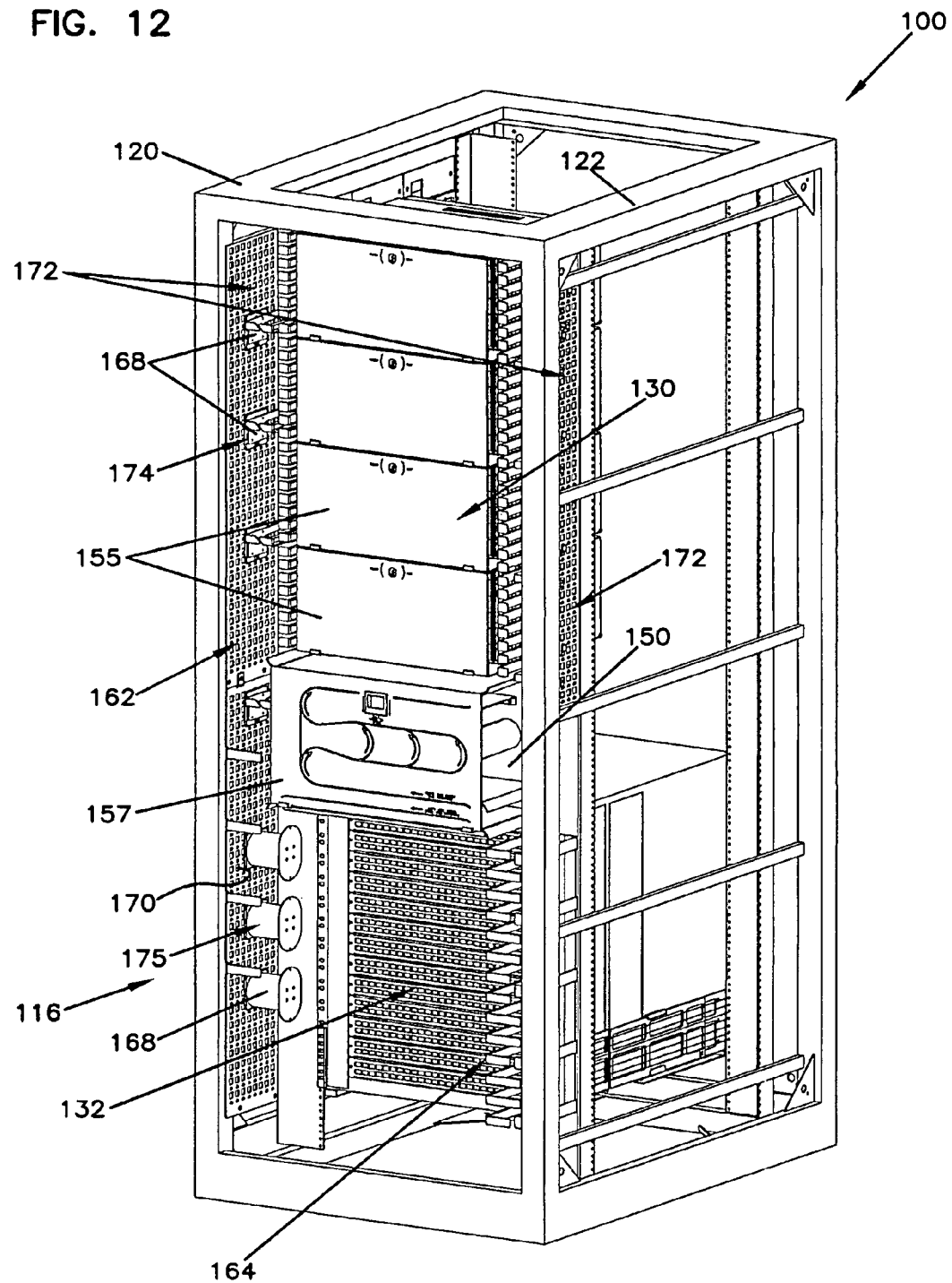
FIG. 12 is a front perspective view of the telecommunications cabinet of FIG. 9, shown with equipment cover panels.

Referring now to FIG. 11, spools 160, 161 are secured to the slack storage panel 150. A majority of the spools 160 are aligned in a generally horizontal arrangement. The generally horizontal arrangement of the spools 160 defines portions of the single cable routing pathway 158. As shown by the routing of patch cord 144 in FIG. 10, no portion of the cable routing pathway 158 overlaps another portion of the cable routing pathway; accordingly, no portion of the patch cord (e.g., 142, 144) overlaps upon itself. As illustrated in FIG. 12, a cover or door panel 157 can be secured over the slack cable panel 150 to protect the patch cord slack stored inside. Likewise, door panels 155 can be secured relative to the patching modules 134 to protect the patch panel connections.

Figure 13:
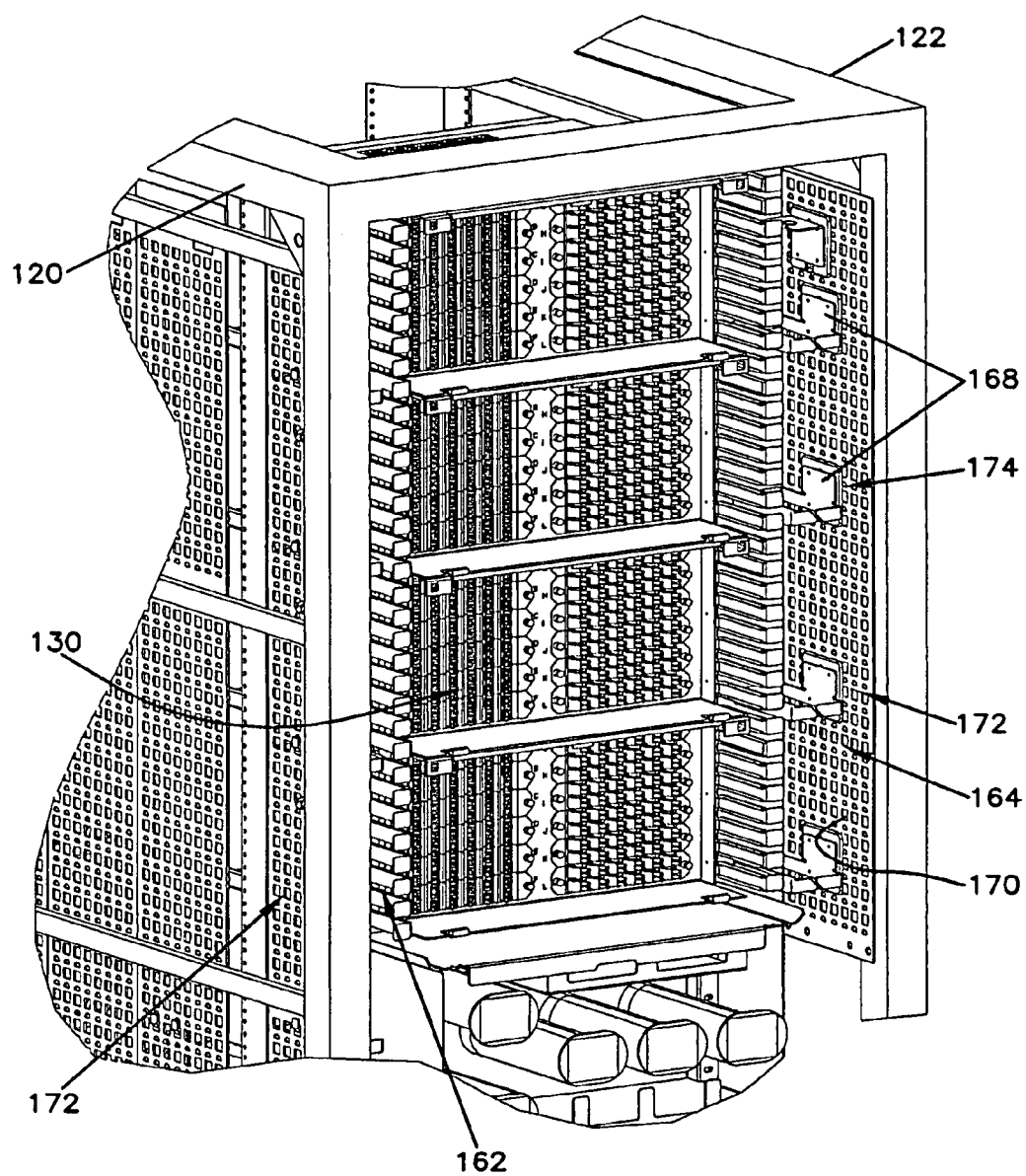
FIG. 13 is a front left-side perspective view of the upper region of the telecommunications cabinet of FIG. 9.

Referring now to FIGS. 12 and 13, the telecommunication system 100 further includes a first vertical cable channel 162 located at a left side 120 of the cabinet 114, and a second vertical cable channel 164 located at a right side 122 of the cabinet 114. Each of the first and second vertical cable channels 162, 164 are located adjacent to the front 116 of the cabinet 114 so that a user can access patch cords routed with the channels 162, 164.

In the illustrated embodiment, at least a portion of each vertical cable channel 162, 164 is defined by cable management devices 168 (such as rings 174 or spools 175). The devices are secured to a mounting face 170 of an interface panel 172 located at each of the left and right sides 120, 122 of the cabinet 114. Further details of one example of an interface panel that can be used are described in U.S. Patent Publication No. 2006/0228087; which publication is previously incorporated herein by reference. The mounting devices 168, such as cable rings and spools, are selectively attachable and detachable to the interface panel 172 so that the system can be customized to the user's particular needs.

The interface panels 172 are each oriented such that the mounting face 170 faces toward an opposite side of the cabinet 114. For example, the mounting face 170 of the right interface panel faces toward the left side 120 of the cabinet; likewise, the mounting face 170 of the left interface panel faces toward the right side 122 of the cabinet. The cable management devices 168 are secured to the sideward mounting faces 170; and accordingly extend from the mounting faces 170 toward one of the left and right sides 120, 122 of the cabinet 114. The vertical cable channels 162, 164 defined by the devices 168 are used in part to vertically route the patch cords between the patch panel and active equipment regions 130, 132 and the slack storage panel 150.

In use, and referring back to FIG. 10, each of the patch cords (e.g., 142, 144) interconnected to a particular half of a zone is routed through at least one of the first and second vertical cable channels 162, 164 and enters the slack storage panel 150 from the same vertical cable channel as that of the other patch cords of that particular half of the patch panel zone. In the previous embodiment, patch cords of particular zones are all routed either upward or downward in one the right and left vertical cable channels. In this embodiment, each of the patch cords (e.g. 144) from the right side (i.e., right half) of all zones A-D is routed down the right vertical cable channel 164, and each of the patch cords (e.g. 142) from the left side (i.e., left half) of all zones A-D is routed down the left vertical cable channel 162.

In particular, each of the patch cords (e.g., 144) of from the right half of the patch panel zones A-D is routed downward through the second vertical cable channel 164 into the entrance 154 of the slack storage panel 150. A middle portion (i.e., the slack length) of the cable is routed within the single cable routing pathway 158 of the slack storage panel 150 such that no portion of the cable overlaps itself. This is accomplished by selectively routing the cable about the spool 160 that best accommodates the excess slack length of the particular patch cord. For patch cords connected at a patch panel connection 136 located higher in the patch panel region 130, the slack length (e.g., 143, only partly shown in dashed line) may be routed about the middle spool, as opposed to the most rightward spool.

Likewise, each of the patch cords (e.g., 142) of from the left half of the patch panel zones A-D is routed downward through the first vertical cable channel 162. The spools 175 in the lower region of the first vertical cable channel 162 are arranged to define a single cable routing pathway similar to that of the slack storage panel. In particular, a middle portion (i.e., the slack length) of the cable 142 is routed about one of the spools 175 such that no portion of the cable overlaps itself. This is accomplished by selectively routing the cable about the spool 175 that best accommodates the excess slack length of the particular patch cord. The cable 142 is then routed through a pass-through region 159 of the slack storage panel 150 and in turn to the active equipment region 132.

Because each of the patch cords of a particular half of the patch panel zones are routed downward through the upper region of only one of the vertical cable channels 162, 164, patch cord density within the vertical cable channels 162, 164 and slack storage panel 150 is better managed. In the illustrated embodiment of FIG. 1, cable density, or space utilized by cables within the vertical channels, is preferably no greater than 50 percent. The disclosed cable density is based upon fiber patch cords having a diameter of approximately 0.080 inches. This arrangement provides ample room or space for a user to access cables located within the particular vertical cable channel.

Figure 14:
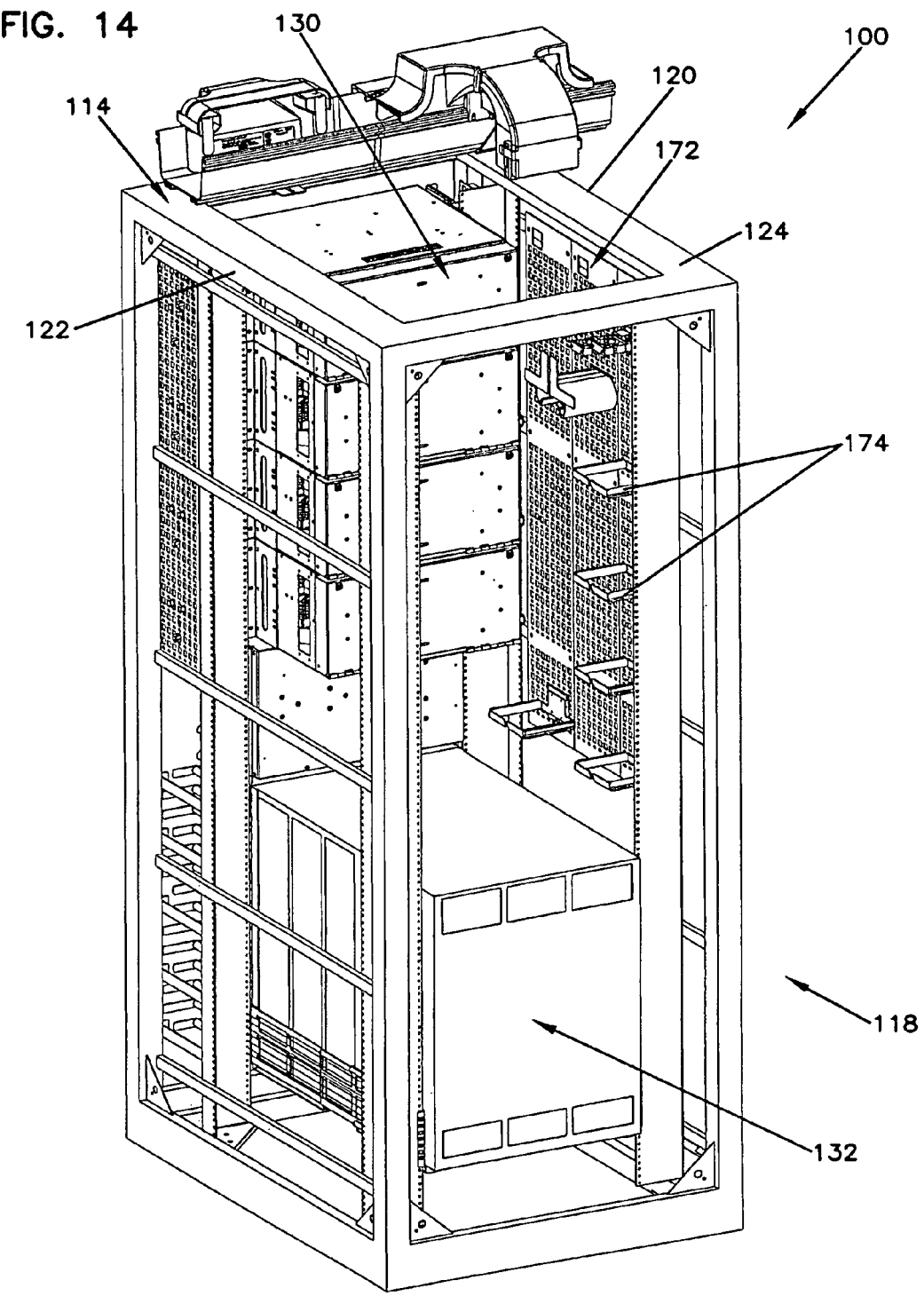
FIG. 14 is a rear perspective view of the telecommunications cabinet of FIG. 9.
Figure 15:
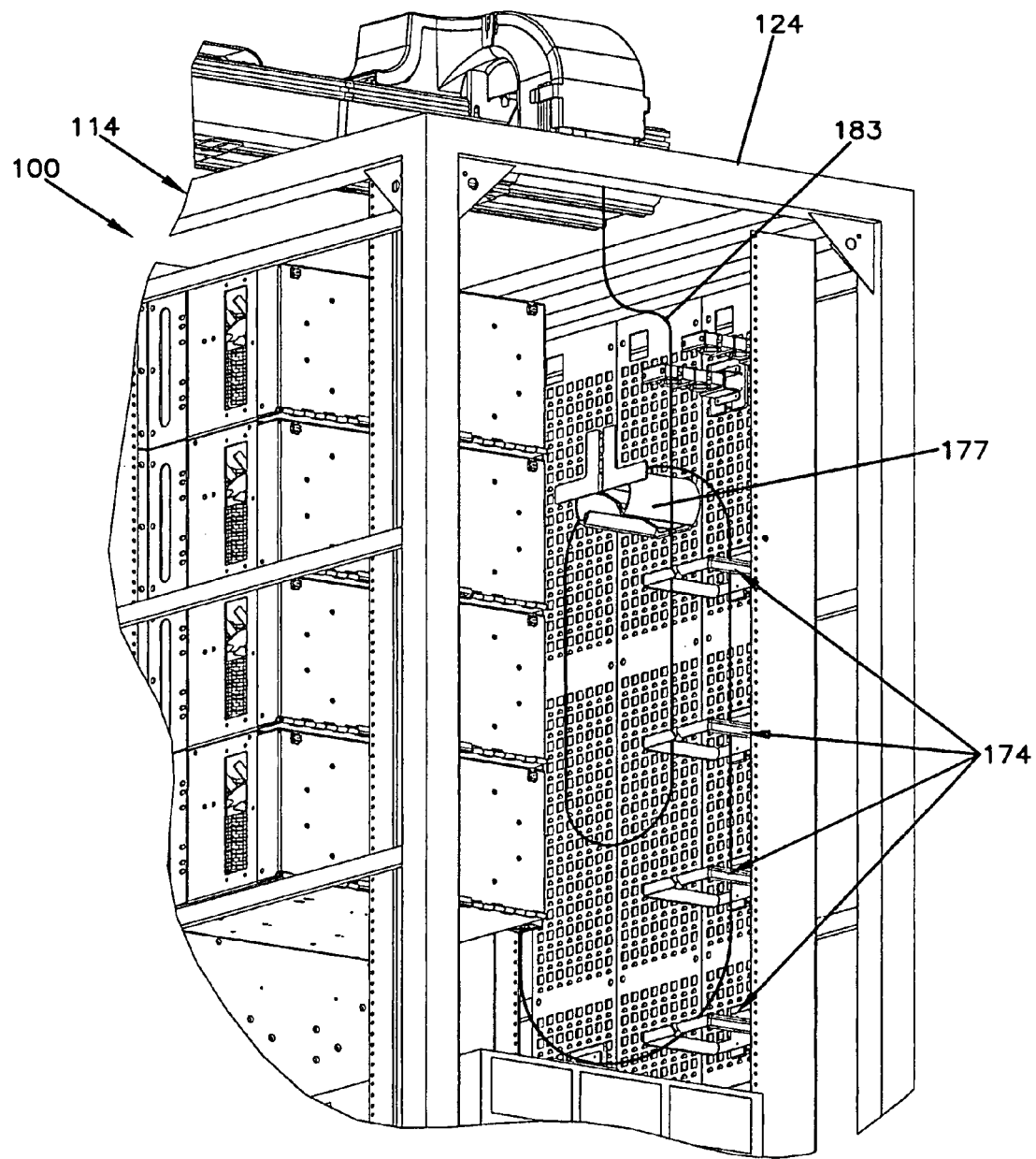
FIG. 15 is another rear perspective view of the telecommunications cabinet of FIG. 9, illustrating a cable routing.

Referring now to FIGS. 14 and 15, the interface panels 172 of the present system 100 can extend toward a rear 118 of the cabinet at one or both sides 120, 122 of the cabinet 114. Cable rings 174 and other cable devices can be mounted at selected locations on the interface panels. The cable rings 174 aid in managing cables 183 (FIG. 15) connected at a rear of the patch panel region 130, which are gathered and routed upwards out a top 124 of the cabinet 114. In one arrangement, as illustrated in FIG. 15, cable slack of the illustrated cable 183 is looped about a radius limiting surface 177 prior to being routed out the top 124 of the cabinet 114. Alternatively, the cables can be routed directly upwards out the top 124 and the cable slack stored in a region outside of the cabinet 114. The cables 183 are routed out the top 124 of the cabinet for connection to other equipment.

The above specification provides a complete description of the present invention. Since many embodiments of the invention can be made without departing from the spirit and scope of the invention, certain aspects of the invention reside in the claims hereinafter appended.

What is claimed is:

1. A telecommunications system, comprising:
   a) a telecommunications frame having a front, a rear, and first and second opposing sides, the front, rear, and sides defining a frame interior;
   b) a patch panel region located within the frame interior, the patch panel region defining a plurality of patch panel connections, the patch panel connections being accessible from the front of the telecommunications frame;
   c) an active equipment region located within the frame interior, the active equipment region defining a plurality of equipment connections, the equipment connections being accessible from the front of the telecommunications frame;
   d) a slack storage panel located between the patch panel region and the active equipment region, the slack storage panel having at least one cable routing pathway, wherein no portion of the cable routing pathway overlaps another portion of the cable routing pathway;
   e) a first vertical cable channel located at the first side of the telecommunications frame, and a second vertical cable channel located at the second side of the telecommunications frame; and
   f) patch cords interconnected to the patch panel connections and the equipment connections, wherein patch cords located adjacent to the first side of the frame are routed from the patch panel connections through only the first vertical cable channel prior to entering the slack storage panel, and wherein patch cords located adjacent to the second side of the frame are routed from the patch panel connections through only the second vertical cable channel prior to entering of the slack storage panel, each of the patch cords interconnected to the connections of the patch panel region entering the slack storage panel in a generally horizontal direction;
   g) wherein the patch cords are routed to the equipment connections in the active equipment region from only one of the first side and the second side of the telecommunications frame.

2. The system of claim 1, wherein the patch cords located adjacent to the second side of the frame enter and exit the cable routing pathway of the slack storage panel from only the second side of the frame.

3. The system of claim 1, wherein the first and second vertical cable channels are at least partly defined by cable management devices secured to a mounting face of right and left interface panels, the mounting face of the right and left interface panels being oriented to face the opposite side of the telecommunications frame.

4. The system of claim 1, wherein the slack storage panel further defines a cable pass-through separate from the cable routing pathway.

5. The system of claim 4, further including spools located within the first vertical cable channel, the patch cords located adjacent to the first side of the frame being routed about the spools prior to entering the cable pass-through of the slack storage panel.

6. The system of claim 4, further including cable management devices located within the first vertical cable channel, the patch cords located adjacent to the first side of the frame being routed about the cable management devices prior to entering the cable pass-through of the slack storage panel.

7. The system of claim 4, wherein the patch cords located adjacent to the first side of the frame are routed from the patch panel region to the active equipment region through the cable pass-through of the slack storage panel, and wherein the patch cords located adjacent to the second side of the frame are routed from the patch panel region to the active equipment region through the cable routing pathway of the slack storage panel.

8. The system of claim 1, wherein the slack storage panel includes a plurality of spools, a number of the spools being aligned in a generally horizontal arrangement, the generally horizontal arrangement defining portions of the cable routing pathway that extend from one side of the frame to the other side of the frame.

9. The system of claim 8, wherein the cable length of each patch cord is the same as that of the other patch cords.

10. The system of claim 1, wherein the slack storage panel includes a plurality of cable management devices, a number of the cable management devices being aligned in a generally horizontal arrangement, the generally horizontal arrangement defining portions of the cable routing pathway that extend from one side of the frame to the other side of the frame.

11. The system of claim 1, wherein the patch cords each have a cable length defined between first and second connection ends, the cable length being routed within the first and second vertical cable channels, a middle portion of the cable length being routed through the slack storage panel.

* * * * *